US012598351B2

(12) United States Patent　　　(10) Patent No.: US 12,598,351 B2
Giladi　　　　　　　　　　　　　(45) Date of Patent: Apr. 7, 2026

(54) METHODS, SYSTEMS, AND APPARATUSES FOR SCALABLE CONTENT DATA UPDATING

(71) Applicant: Comcast Cable Communications, LLC, Philadelphia, PA (US)

(72) Inventor: Alexander Giladi, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/663,287

(22) Filed: May 14, 2024

(65) Prior Publication Data

US 2025/0310606 A1　　Oct. 2, 2025

Related U.S. Application Data

(60) Provisional application No. 63/571,032, filed on Mar. 28, 2024.

(51) Int. Cl.
H04N 21/458　　(2011.01)
H04N 21/2187　　(2011.01)
(Continued)

(52) U.S. Cl.
CPC ....... H04N 21/458 (2013.01); H04N 21/2187 (2013.01); H04N 21/26291 (2013.01); H04N 21/437 (2013.01)

(58) Field of Classification Search
None
See application file for complete search history.

(56) References Cited

U.S. PATENT DOCUMENTS 6,502,139 B1　12/2002　Birk et al.
8,751,445 B2 *　6/2014　Takeuchi ............. G06F 16/275
　　　　　　　　　　　　　　　707/624
(Continued)

FOREIGN PATENT DOCUMENTS

CN　　　102550034 A　*　7/2012　....... H04N 21/44209
CN　　　108886626 A　*　11/2018　....... H04N 21/26225
(Continued)

OTHER PUBLICATIONS

Extended European Search Report issued in related application No. EP25166381.1 dated Jun. 4, 2025.
(Continued)

*Primary Examiner* — William J Kim
(74) *Attorney, Agent, or Firm* — Ballard Spahr LLP

(57)　　　　　　ABSTRACT

Methods, systems, and apparatuses for updating content data are described herein. A single manifest file may be maintained per content item and provided to client devices with an update file. The manifest file each client device receives may not initially facilitate output of content segments. Instead, the manifest file may be a partial manifest file that initializes playback and/or facilitates output of a most-recent content segment(s). The client devices may each determine a playback timeline. And each client device may use the corresponding update file to modify the manifest file based on the determined playback timeline, resulting in a modified manifest file that facilitates output of one or more content segments associated with the playback timeline for that particular client device.

20 Claims, 9 Drawing Sheets

(51) Int. Cl.
   *H04N 21/262*     (2011.01)
   *H04N 21/437*     (2011.01)

(56)              References Cited

U.S. PATENT DOCUMENTS

| 9,066,138 B1 * | 6/2015 | Kraiman ............ H04N 21/2668 |
| 9,578,395 B1 | 2/2017 | Qureshi et al. |
| 11,012,731 B2 | 5/2021 | Jones et al. |
| 2007/0203720 A1 * | 8/2007 | Singh ..................... G06Q 40/00 |
| | | 705/7.11 |
| 2009/0006177 A1 * | 1/2009 | Beaver ............... G06Q 30/0263 |
| | | 705/14.6 |
| 2009/0204994 A1 | 8/2009 | Kaminski et al. |
| 2012/0042050 A1 | 2/2012 | Chen et al. |
| 2012/0042090 A1 * | 2/2012 | Chen ...................... H04L 65/70 |
| | | 709/231 |
| 2013/0067052 A1 | 3/2013 | Reynolds et al. |
| 2013/0159421 A1 * | 6/2013 | Yue .................... H04N 21/4622 |
| | | 709/204 |
| 2014/0013375 A1 * | 1/2014 | Giladi ................... H04L 67/306 |
| | | 725/112 |
| 2014/0150044 A1 * | 5/2014 | Takahashi ........ H04N 21/23116 |
| | | 725/116 |
| 2014/0230003 A1 * | 8/2014 | Ma ..................... H04N 21/4147 |
| | | 725/115 |
| 2014/0281009 A1 | 9/2014 | Moorthy et al. |
| 2015/0032855 A1 * | 1/2015 | Wang .................. H04N 21/812 |
| | | 709/219 |
| 2015/0261600 A1 | 9/2015 | Iturralde et al. |
| 2016/0127440 A1 | 5/2016 | Gordon |
| 2016/0198012 A1 | 7/2016 | Fablet et al. |
| 2017/0171094 A1 | 6/2017 | Biderman et al. |
| 2017/0353516 A1 | 12/2017 | Gordon |
| 2017/0374411 A1 | 12/2017 | Lederer et al. |
| 2018/0234714 A1 | 8/2018 | Johns |
| 2018/0255036 A1 | 9/2018 | Fiedler |
| 2019/0052689 A1 * | 2/2019 | Cain ................... H04N 21/8456 |
| 2019/0222879 A1 * | 7/2019 | Jones .............. H04N 21/23439 |
| 2019/0313150 A1 * | 10/2019 | Cava .................. H04N 21/4402 |
| 2019/0342356 A1 * | 11/2019 | Thomas ............ H04N 21/8458 |
| 2019/0349630 A1 * | 11/2019 | Stockhammer .... H04N 21/8456 |
| 2020/0037008 A1 | 1/2020 | Hassler |
| 2020/0195754 A1 * | 6/2020 | Seo ..................... G06F 16/2379 |
| 2022/0201366 A1 | 6/2022 | Ross et al. |
| 2022/0217194 A1 * | 7/2022 | Sodagar .................. H04L 65/75 |
| 2023/0124840 A1 * | 4/2023 | Giladi ............... H04N 21/4334 |
| | | 386/241 |
| 2023/0328308 A1 | 10/2023 | Marciano et al. |

FOREIGN PATENT DOCUMENTS

| CN | 110807039 A * | 2/2020 | ............. G06F 16/27 |
| EP | 2853075 B1 * | 10/2016 | ........ H04N 21/2541 |
| JP | 2012123693 A * | 6/2012 | |
| JP | 2017098703 A * | 6/2017 | |

OTHER PUBLICATIONS

European Search Report issuped in related application No. EP23179882.8 mailed Aug. 7, 2023.

"An MPD delta file for HTTP Streaming," Research in Motion UK Limited, Prague, Czech Republic, Jun. 21-24, 2010.

"DASH MPD Delta Files," Research in Motion, Guangzhou, China, Oct. 2010.

Zia et al., "Delta MPD in Message Update," Qualcomm, Shanghai, China, Oct. 2012.

Giladi, "Patching MPD's: techniques for efficient MPD updates," Geneva, Switzerland, Jan. 2013.

\* cited by examiner

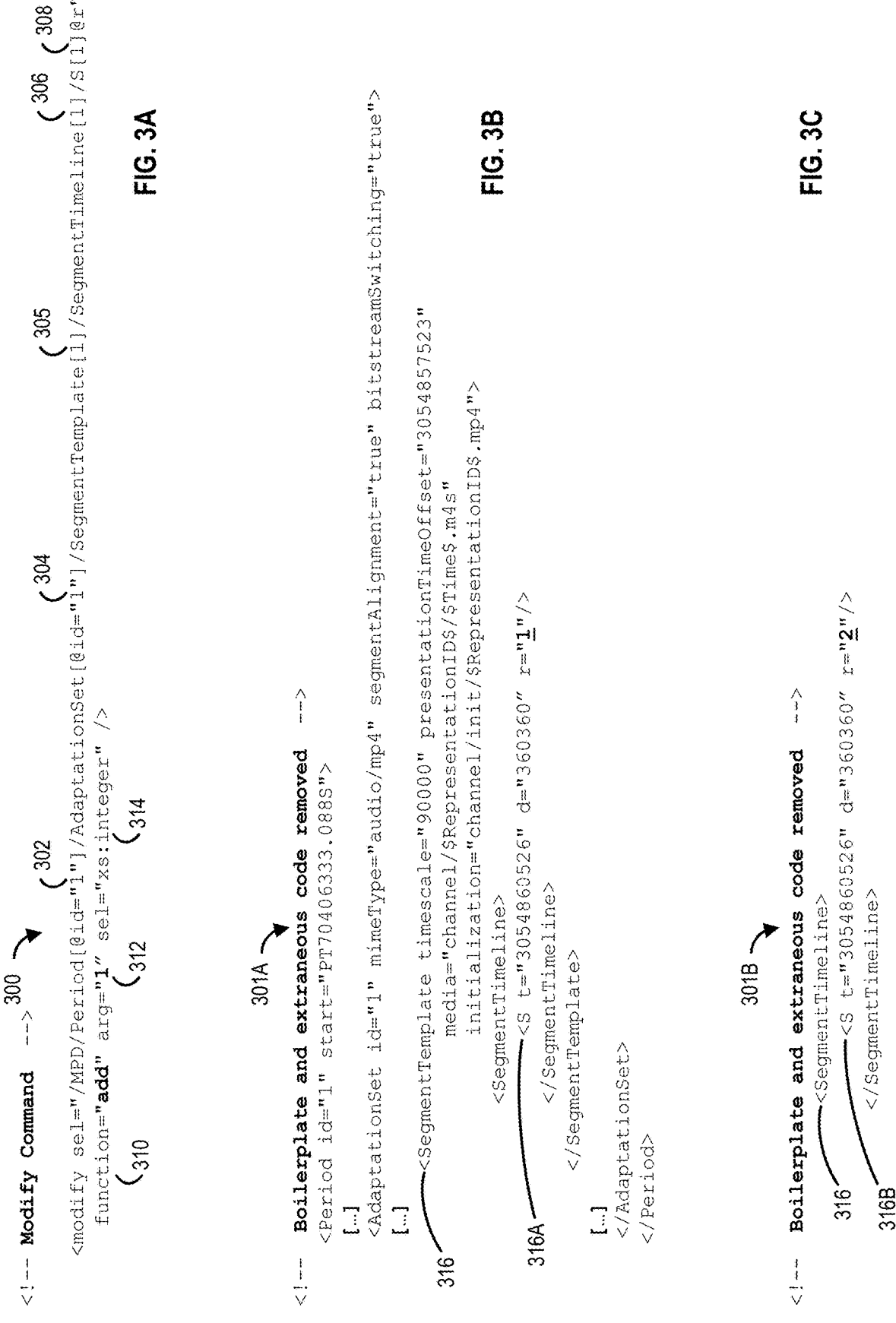

```
<!-- Modify Command --> 300
<modify sel="/MPD/Period[@id="1"]/AdaptationSet[@id="1"]/SegmentTemplate[1"]/SegmentTimeline[1]/S[1]@r"
function="add" arg="1" sel="xs:integer" />
```
302  304  305  306  308
310  312  314

FIG. 3A

```
<!-- Boilerplate and extraneous code removed --> 301A
<Period id="1" start="PT70406333.088S">
[...]
<AdaptationSet id="1" mimeType="audio/mp4" segmentAlignment="true" bitstreamSwitching="true">
[...]
<SegmentTemplate timescale="90000" presentationTimeOffset="3054857523"
media="channel/$RepresentationID$/$Time$.m4s"
initialization="channel/init/$RepresentationID$.mp4">
<SegmentTimeline>
<S t="3054860526" d="360360" r="1"/>
</SegmentTimeline>
</SegmentTemplate>
[...]
</AdaptationSet>
</Period>
```
316
316A

FIG. 3B

```
<!-- Boilerplate and extraneous code removed --> 301B
<SegmentTimeline>
<S t="3054860526" d="360360" r="2"/>
</SegmentTimeline>
```
316
316B

610
RECEIVE A MANIFEST FILE AND AN UPDATE FILE

620
MODIFY, BY A FIRST COMPUTING DEVICE, THE MANIFEST FILE

630
MODIFY, BY A SECOND COMPUTING DEVICE, THE MANIFEST FILE

640
CAUSE A FIRST PLURALITY OF CONTENT SEGMENTS TO BE OUTPUT

650
CAUSE A SECOND PLURALITY OF CONTENT SEGMENTS TO BE OUTPUT

900

910

DETERMINE A FIRST CONTENT SEGMENT

920

GENERATE A MANIFEST FILE AND AN UPDATE FILE

930

SEND THE MANIFEST FILE AND THE UPDATE FILE

METHODS, SYSTEMS, AND APPARATUSES FOR SCALABLE CONTENT DATA UPDATING

CROSS-REFERENCE TO RELATED PATENT APPLICATION

This application claims priority to U.S. Provisional Application No. 63/571,032, filed on Mar. 28, 2024, the entirety of which is incorporated by reference herein.

BACKGROUND

Content data for content items may be updated at varying levels of frequency. For example, content data for on-demand content may require less updates than linear/live content, which may be quite dynamic over time as linear/live content items progress and new portions become available. Existing solutions for updating such content data may require an extensive amount of computational resources that may present issues when performed at scale. These and other considerations are discussed herein.

SUMMARY

It is to be understood that both the following general description and the following detailed description are exemplary and explanatory only and are not restrictive. Manifest files in content delivery systems are used by client devices to request content items for output. In some existing content delivery systems, when multiple client devices output a content item at different times, such tuning to a same channel or outputting a same live/linear content item at different times, a manifest file may be generated for each of those client devices. However, doing so may involve a significant amount of compute and storage requirements.

Rather than maintaining separate manifest files for each client device, the present methods, systems, and apparatuses may utilize a single manifest file per content item. The manifest file may be provided to each client device that requests the content item along with an update file. As an example, client devices that request a content item may each receive a manifest file and an update file. Each client device may determine a corresponding playback timeline. And each client device may use its respective update file to modify the manifest file based on the corresponding playback timeline, resulting in a modified manifest file that facilitates output of one or more content segments associated with the playback timeline for the corresponding client device.

Other examples are possible as well. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein:

FIG. 3A shows a portion of an example update file;
FIG. 3B shows a portion of an example manifest file pre-modification;

FIG. 3C shows a portion of the example manifest file post-modification.

DETAILED DESCRIPTION

Figure 1:
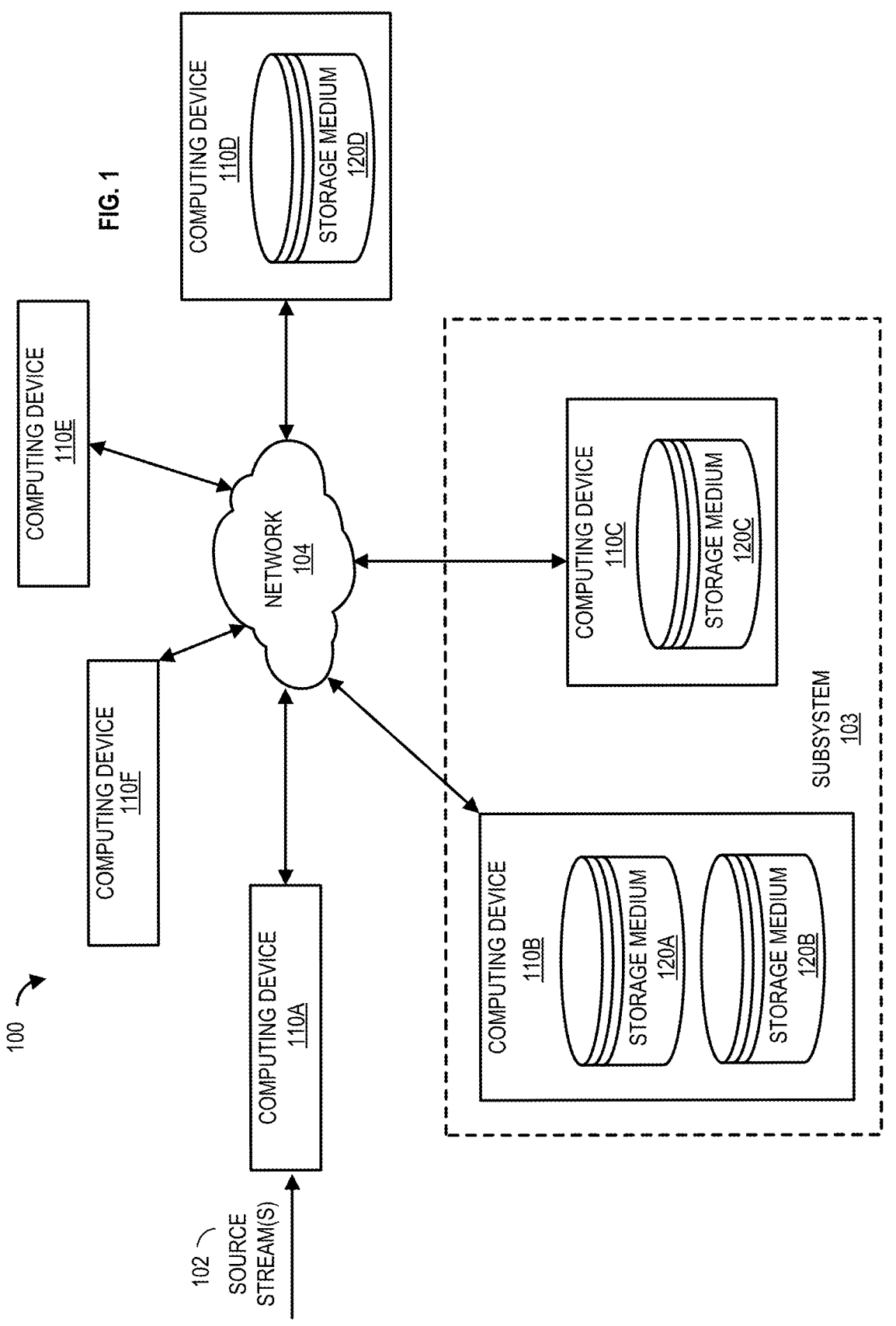
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

The method steps recited throughout this disclosure may be combined, omitted, rearranged, or otherwise reorganized with any of the figures presented herein and are not intended to be limited to the four corners of each sheet presented. The techniques disclosed herein may be implemented on a computing device(s) in a way that improves performance and/or efficiency of operation, as further described herein.

FIG. 1 shows an example system 100. The system 100 may comprise a content delivery network, a data network, a content distribution network, or any other network or content distribution system. The system 100 may comprise computing devices 110A-110F. Any of the computing devices 110A, 110B, 110C, 110D, and/or 110E shown in the system 100 may comprise any number of components/modules, storage mediums, etc., in addition to (or less than) the components/modules, storage mediums, etc., that are shown in FIG. 1. For example, as shown in FIG. 1, the computing devices 110B-110D each comprise one or more storage mediums. In other configurations of the system 100, those storage mediums may be separate devices (e.g., data servers) or they may be part of another computing device shown in the system 100.

The computing devices 110A-110F may communicate via a network 104. The network 104 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent on the network 104 via a variety of transmission paths, including wireless paths (e.g., satellite paths, Wi-Fi paths, cellular paths, etc.) and terrestrial paths (e.g., wired paths, a direct feed source via a direct line, etc.).

The system 100 may comprise a subsystem 103. The subsystem 103 may comprise an upstream portion/tier (e.g., an origin) of a content delivery network, a data network, a subsystem or portion of a content distribution network, or any other network or content distribution system. As shown in FIG. 1, the computing devices 110B and 110C may be part of the subsystem 103; however, it is to be understood that the subsystem 103 may comprise greater or fewer devices than the computing devices 110B and 110C. The subsystem 103 may generate and/or output portions of content for consumption (e.g., output). For example, the subsystem 103 may convert raw versions of content (e.g., broadcast content) into compressed or otherwise more "consumable" versions suitable for playback/output by client devices, user devices, media devices, and other consumer-level computing devices. "Consumable" versions of content—or portions thereof—generated and/or output by the subsystem 103 may include, for example, data files adhering to Dynamic Adaptive Streaming over HTTP (DASH), ITU-T H.261, ITU-T H.262 (MPEG-2 video), ITU-T H.263, ITU-T H.264 (MPEG-4 AVC), ITU-T H.265 (MPEG HEVC), ITU-T H.266 (MPEG VVC), MPEG EVC, MPEG LC-EVC, AOM AV1, VP9, or any other video file format, whether such format is presently known or developed in the future. Content data may include, for example, manifest files for content items. Manifest files may include, for example, one or more files, media presentation description files, or any other suitable files or data structures for providing client devices with the information needed to generate requests for portions of content items (collectively referred to herein as "manifest files").

The computing device 110A may comprise an encoder, a transcoder, and/or any other device(s)/module(s) suitable for receiving raw forms of content and generating consumable content. The computing device 110A may receive a source stream 102 and transcode the source stream 102 to generate one or more transcoded streams, encoded streams, channels, transmissions, etc. (referred to herein collectively as "transcoded streams") for each content item. The source stream 102 may be a digital television channel, a live stream (e.g., a linear content stream), a previously recorded stream, a video-on-demand (VOD) stream, etc. The computing device 110A may receive the source stream 102 from an external source (e.g., a stream capture source, a data storage device, a media server, etc.). The computing device 110A may receive the source stream 102 via a wired or wireless network connection, such as the network 104 or another network (not shown). It should be noted that although a single source stream 102 is shown in FIG. 1, this is not to be considered limiting. The computing device 110A may receive any number of source streams 102. The computing device 110A may send the transcoded streams to the subsystem 103.

The computing device 110B may store content segments (e.g., based on the source stream(s) 102 received via the computing device 110A) in the storage medium 120A and corresponding content data (also referred to herein as "content metadata") in a storage medium 120B. For example, the computing device 110B may comprise a cloud digital video recorder, an ingest handler, a segment handler, and/or any other suitable device(s)/module(s) for generation and/or storage of segments and associated content data. The computing device 110B may comprise a storage medium 120A for storing content segments and a storage medium 120B for storing content data generally. For example, content segments may be generated and/or prepared for consumption by the computing device 110A for each content item (or linear channel) of a plurality of content items (or linear channels), and the corresponding content data may be stored in the storage medium 120B. The computing device 110B may further comprise a server. For example, the computing device 110B may comprise a content server and/or any other suitable device(s)/module(s) for processing requests for content, manifest files, and/or segments of content.

The computing device 110C may comprise a manifest generator, a manifest updater, and/or any other suitable device(s)/module(s) for generating manifest files and update files for content (and/or portions thereof). The computing device 110C may generate a manifest file facilitating access to content segments for content items at various representations/quality levels. A manifest file may be generated for each content item (or portion thereof). The computing device 110C may generate manifest files based on the segments stored in the storage medium 120A and corresponding content data stored in the storage medium 120B. Manifest files may be, for example, media presentation description files (MPD files) for DASH content items. The computing device 110C may generate manifest files based on a manifest type and/or a content segmentation type. For example, the computing device 110C may generate manifest files that are number-based, list-based, time-based, etc.

Each manifest file may be generated as a tree or other hierarchy of elements. For example, for content items using DASH, a manifest file may include a Period element that describes a particular duration of the content item or content segment (e.g., a duration of the content item bound by a start time and an end time). The Period element may include, as child elements, Representation elements identifying each representation of the content item available. The Representation elements may describe various attributes of the corresponding representation of the content item, allowing for a client device to select a representation for output/streaming based on device capabilities (e.g., display resolution, supported file formats, buffer availability, etc.) and/or based on available bandwidth, etc. Each manifest file may include a variety of other elements as well, as those skilled in the art may appreciate. The computing device 110C may comprise a storage medium 120C for storing manifest files (or portions thereof) and/or update files.

The computing device 110E may comprise a client device, such as a content/media player, a set-top box, a smart device, a mobile device, a user device, etc. The computing device 110E may request content and/or output content (also referred to as "playback" of content). The computing device 110F may comprise a client device, such as a content/media player, a set-top box, a smart device, a mobile device, a user device, etc. The computing device 110F may request content and/or output content (also referred to as "playback" of content). The system 100 may comprise any number of computing devices and/or client devices that request and/or output content items (or portions thereof).

The subsystem 103 may support multiple content segmentation types. The computing device 110B may generate segments for each of the content segmentation types supported by the subsystem 103. Segments may alternately be referred to as "chunks." The subsystem 103 may support both multiplexed segments (video and audio data included in a single multiplexed stream) and non-multiplexed segments (video and audio data included in separate non-multiplexed streams). Further, the subsystem 103 may support container formats in compliance with international standards organization base media file format (ISO-BMFF, as defined in ISO/IEC 14496-12), motion picture experts group 2 transport stream (MPEG-2 TS, as defined in ISO/IEC 13818-1), extensible binary markup language (EBML), WebM, Matroska, or any combination thereof. The computing device 110B may store the segments in the storage medium 120A and corresponding content metadata in the storage medium 120B.

The transcoded streams generated by the computing device 110A may correspond to a plurality of adaptive bitrate (ABR) representations of the source stream 102 (e.g., a mezzanine feed). For example, the plurality of ABR representations may differ from each other with respect to audio bitrate, a number of audio channels, an audio CODEC, a video bitrate, a video frame size, a video CODEC, a combination thereof, and/or the like. The transcoded streams may be sent to the computing device 110D (e.g., a just-in-time packager) for processing and subsequent delivery of content to the computing device 110E. For example, the source stream 102 (e.g., a mezzanine feed) may be used to generate one or more representations of a content item that have varying bitrates and/or alternative CODECs on-the-fly.

Each of the computing devices 110E,110F may communicate with the computing device 110D when requesting and/or receiving content items, content segments, and/or content data. The computing device 110D may comprise a storage medium 120D for storing content items, content segments, and/or content data requested by and/or sent to the computing devices 110E,110F. The computing device 110D may receive manifest files and update files for content items from the subsystem 103. The computing device 110D may receive a request associated with content items from the computing devices 110E,110F according to manifest files and/or update files for the content items. The computing device 110D may retrieve content segments from the subsystem 103, prepare/package the segments for output by the computing devices 110E,110F, and deliver the requested segments to the computing devices 110E,110F.

As an example, the computing device 110E may initiate a playback session to output/playback a content item and send a request for a manifest file (e.g., an HTTP GET request) associated with the content item to the computing device 110D. The computing device 110D may receive the request for the manifest file and forward the request to the subsystem 103. For example, the computing device 110D may forward the request for the manifest file to the computing device 110C in instances where the storage medium 120D does not present have the manifest file stored/cached. Other examples are possible as well.

The manifest file initially provided to the computing device 110E may be a partial manifest file that initializes playback and/or facilitates output of a most-recent content segment(s). The manifest file may be sent to the computing device 110E at a first time when one or more content segments are available for delivery/output and the content item/segment(s) is initially requested (e.g., for playback/output, recording, or both). The manifest file sent to the computing device 110E at the first time may be updated based on additional content segments that may become available for delivery/output (e.g., newly transcoded, encoded, packaged, etc.).

Figure 2:
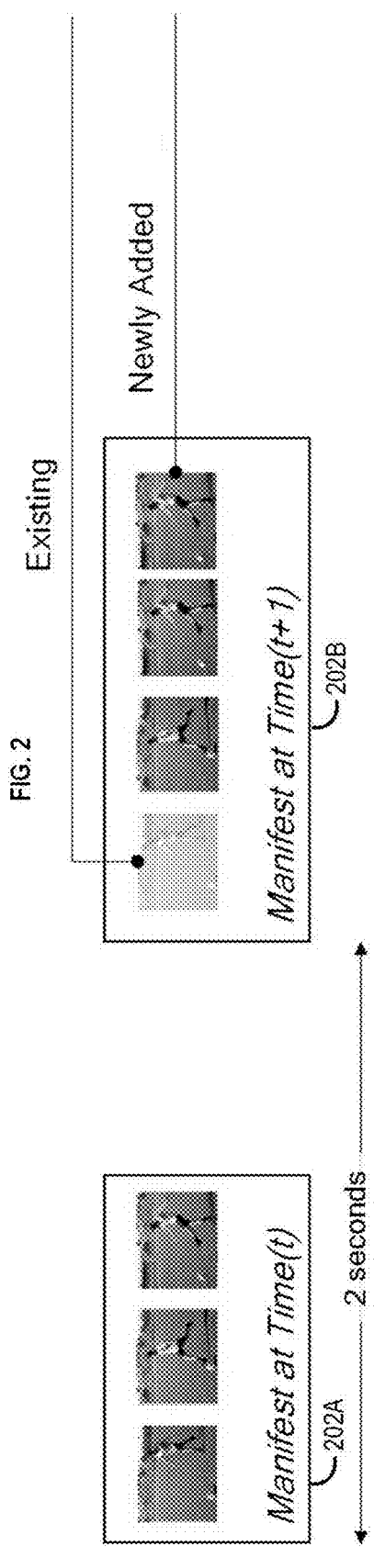
FIG. 2 shows illustrations of example content data.

For example, the manifest file sent to the computing device 110E at the first time may need to be updated/modified when new content segments or portions of the content item are available for delivery/output. FIG. 2 shows a graphical representation of a portion of a manifest file 202A for a content item at time (t) (e.g., the manifest file sent to the computing device 110E at the first time). The portion of the manifest file 202A shows three frames of the content item, which may correspond to a duration of roughly 2 seconds, for purposes of explanation. FIG. 2 also shows a graphical representation of an update file 202B for the manifest file at time (t+1) (e.g., an update to the manifest file). The update file 202B indicates the first frame of the content item included in 202A (e.g., an existing frame/portion of the content item) may not be included in 202B. The update file 202B also indicates a new frame/portion of the content item that was not included in the manifest file 202A—that is, content data/information the computing device 110E may use to request the new frame/portion for output—may be included in the update file 202B. The content data/information the computing device 110E may use to request the new frame/portion for output may be included in the update file 202B rather than sending an entirely new manifest file. The update file 202B may allow the computing device 110E to update the manifest file 202A. The update file 202B may therefore be considered as a "patch" file, which may convey the change(s), difference(s), etc., in the content (e.g., the newly-added frame/portion). Additionally, as further described herein with respect to FIGS. 3A-3B, the update file 202B may, in some examples, exclude some standard (e.g., boilerplate) content data within the manifest file 202A previously received.

FIG. 3A shows a portion of an example update file 300 (e.g., the update file 202B). Continuing with the example above in which the computing device 110E requests the manifest file at the first time, the update file 300 may be sent to the computing device 110E at or near the first time as well. The first time may correspond to a time at which the computing device 110E requested the content item (or portion thereof), such as when the computing device 110E may have tuned to a corresponding digital television channel or requested a live stream (e.g., a linear content stream), a previously recorded stream, a video-on-demand (VOD) stream, etc., associated with the content item.

FIG. 3B shows a portion of an example manifest file 301A (e.g., the manifest file 202A), such as the manifest file received by the computing device 110E in the example above. The manifest file 301A may comprise a plurality of manifest elements. The plurality of manifest elements may identify segments of the content item, define one or more parameters of the content item, etc. The plurality of manifest elements may comprise, for example, elements defined in the MPEG DASH specification. For example, the manifest file 301A may comprise information/content data associated with the content item, such as a Period element(s), an AdaptationSet element(s), a Representation element(s), a SegmentTemplate element(s), a ContentProtection element (s), etc.

The manifest file 301A may identify a most-recently-available content segment for the content item based on the first time (e.g., the time at which the computing device 110E requested the content item (or portion thereof)). For example, the content item may be a live content item, a linear content item/stream, a combination thereof, and/or the like. And the manifest file 301A may have been requested at or near a time that the content segment identified therein (the most-recently-available content segment) was encoded and/or otherwise became available for output. Accordingly, at least a portion of the manifest file 301A that identifies the most-recently-available content segment may be updated when a content segment(s) for the content item becomes available. For example, the portion of the manifest file 301A that identifies the most-recently-available content segment may be updated by the computing device 110C, a manifest generator, a manifest updater, and/or any other suitable device(s)/module(s) for generating manifest files and update files for content (and/or portions thereof). Therefore, in some examples, the "first content segment" referred to in the manifest file 301A may be request-time-specific, and the manifest file 301A as-received by a first computing device(s) that requests the content item at a first time may indicate a different content segment(s) than the manifest file 301A as-received by a second computing device(s) that requested the content item at a different time (e.g., when a different content segment was most recently made available). The plurality of manifest elements may comprise an element 316A of a SegmentTimeline 316 (also referred to a "timeline" or "segment timeline"). The timeline 316 may indicate a time at which a content segment(s) is available and/or indicated for playback. The timeline 316 may use a run-length type of coding. For example, as shown in FIG. 3B, the element 316A of the timeline 316 is shown as <S t="3054860526" d="360360" r="1"/>), where the value for "t" within the element 316A may indicate a start time for the first content segment (referred to herein as "S@t"); the value for "d" within the element 316A may indicate a segment duration (referred to herein as "S@d"); and the value for "r" within the element 316A may indicate a number of consecutive/sequential content segments that follow the first content segment at the start time (referred to herein as "S@r"). The value for "r" in terms of numbering may be zero-based. For example, an "r" value of zero "0" may mean there is 1 consecutive/sequential content segment; an r" value of zero "1" may mean there are 2 consecutive/sequential content segments, etc. Other numbering schemes for "r" may be used as well. As seen in FIG. 3B, the value for S@r in the element 316A is "0", which may correspond to one "1" available content segment (the "first content segment") for output by the requesting device.

Continuing with the example above in which the computing device 110E requests the manifest file at the first time, and returning to FIG. 3A, the portion of the update file 300 shown comprises a command/function-referred to herein as the "modify command." The modify command may comprise a function 310 that enables the computing device 110E (or any other requesting device(s)) to update one or more portions of the manifest file 301A (e.g., the manifest file 202A). For example, the function 310 of the modify command in the update file 300 may cause one or more portions of the manifest file 301A to be updated/modified, such as by appending or modifying content data/information associated with a frame/portion of the content item that is available for output. For example, the computing device 110E may execute, perform, or apply (or cause execution of, performance of, or application of) the function 310 of the modify command in the update file 300 to the element 316A in the manifest file 301A.

As shown in FIG. 3A, the modify command may comprise elements 302, 304, 305, 306, 308 that each identify or indicate a portion or element of the manifest file 301A to be updated/modified. For example, the elements 302, 304, 305, and 306 may collectively identify or indicate the timeline 316. The element 302 may correspond to a Period element within the portion of the manifest file 301A comprising the timeline 316. The element 304 may correspond to an AdaptationSet element within the portion of the manifest file 301A comprising the timeline 316. The element 305 may correspond to a SegmentTemplate element within the portion of the manifest file 301A comprising the timeline 316. The element 306 may directly identify or indicate to the timeline 316. And the element 306 may correspond to the S@r value in the element 316A of the timeline 316. The elements 302, 304, 305, 306, 308 may collectively serve as a first argument (or a first input) provided to the function 310.

The function 310 may determine a particular portion(s) or element(s) of the manifest file 301A to be updated/modified based on the elements 302, 304, 305, 306, 308 (the first argument/first input). In the example shown in FIGS. 3A and 3B, the particular portion(s) or element(s) of the manifest file 301A to be updated/modified based on the elements 302, 304, 305, 306, 308 (the first argument/first input) is the S@r value ("1") in the element 316A of the timeline 316.

The modify command may further comprise elements 312 and 314 associated with the function 310. The element 312 may represent a parameter for the function 310, and the element 314 may represent a data type for an element(s) to be selected by the function 310 and subsequently updated/modified based on the parameter associated with the element 312. For example, the parameter indicated by the element 312 in the example shown in FIG. 3A has a value of "1" and the data type indicated by the element 314 is "integer."

As part of executing, performing, or applying (or causing execution of, performance of, or application of) the function 310 of the modify command in the update file 300 to the particular portion(s) or element(s) of the manifest file 301A, the data type indicated by the element 314 may be compared to a type of the function 310 (e.g., to ensure the function 310 will execute properly). For example, as shown in FIG. 3A, the type of the function 310 has a value of "add"-meaning the function 310 will be adding the parameter value ("1") (as indicated by the element 312) to an element within the manifest file 301A having a data type of "integer." And because the element within the manifest file 301A to be updated/modified (the S@r value of "1") is an integer, the function 310 will execute properly. Thus, acceptable/compatible parameter values for the element 312 may be based on the data type indicated by the element 314 and the type of the function 310. The device executing the function 310 may perform such a compatibility check before executing the function 310.

In examples where the compatibility check fails and/or in examples where the first argument (or the first input) described above (e.g., based on the elements 302, 304, 305, 306, 308) identify or indicate a non-existent portion of the manifest file 301A to update or modify, then the function 310 may not execute, may cause an error(s), etc. To prevent this from occurring the devices within the system 100 may be configured to execute, perform, or apply (or cause execution of, performance of, or application of) the function 310 of the modify command in the update file 300 in a "strict mode" as well as a "relaxed mode."

In the strict mode, a failure may cause the requesting client device (the computing device 110E in this example) to request a full manifest file (or a failover manifest file in case the latter request fails) that comprises content data/information that facilitates output of content segments without modification or updates. In the relaxed mode, a failure be ignored; a remedial action may be performed; other functions within the update file 300 may occur; a combination thereof; and/or the like. The particular mode may be indicated by an extra attribute at a top level of the update file 300 and/or as an attribute of the function 310 (not shown in FIG. 3A), as non-limiting examples.

As part of executing, performing, or applying (or causing execution of, performance of, or application of) the function 310 of the modify command in the update file 300 to the particular portion(s) or element(s) of the manifest file 301A, the requesting client device, which is the computing device 110E in this example, may determine a playback timeline. The playback timeline for the computing device 110E may be based on an available playback time range associated with the content item. The playback time range may be based on, as an example, a time ("T") the requesting device sent the corresponding request for the content item (the "first time" noted above in this example). Additionally, or in the alternative, the playback time range may be based on a time-shift buffer associated with the computing device 110E (e.g., a storage medium or media for storage/buffering of content segments). The time-shift buffer associated with the computing device 110E may be associated with a maximum value (e.g., a maximum duration for one or more content segments that may be stored in the time-shift buffer at once)—referred to herein as "TSB".

As shown in FIG. 3B and discussed above, the element 316A of the timeline 316 is shown as <S t="3054860526" d="360360" r="1"/>), and the value for "t" within the element 316A indicates the start time for the first content segment ("S@t"). The first content segment may be a most-recently-available content segment (e.g., recently encoded) for the content item after the first time ("T") when the computing device 110E sent the corresponding request for the content item. The start time for the first content segment (S@t) may have a time value of 3054860526 and the value for "d" within the element 316A (the segment duration "S@d") may have a time value/duration of 360360.

At the first time ("T") when the computing device 110E sent the corresponding request for the content item, the content item may have been associated with a playback time having a time value of 3054500166. Therefore, assuming a current playback time associated with the content item, "T(Now)", has a time value of 3055581246, and assuming the maximum value/TSB value for the buffer(s) of the computing device 110E corresponds to a value of 792792, then the playback time range may be between T(Now) and (T or T(Now)—TSB), whichever is greater. For this example, the playback time range would be between 3055581246 and max {3054500166, 3054788454}, which would result in a range between time value 3055581246 and 3054788454. Therefore, the playback timeline for the computing device 110E in this example would be defined as the content segments that are available between time values 3055581246 and 3054788454, which would be at most two full content segments, since the segment duration value ("S@d") is 360360 and (3055581246-3054788454)/ 360360=2.2 (e.g., at most 2 full/complete content segments).

Additionally, or in the alternative, the playback timeline and/or the playback time range may not be bound by a maximum value/TSB value associated with a requesting computing device's buffer. For example, the playback timeline and/or the playback time range may include the entirety of the content item from its beginning (e.g., when the live/linear content item/stream became available) up to the time at which the requesting computing device sent the corresponding request for the content item. As another example, the playback timeline and/or the playback time range may be based on content type; access restrictions; subscription rules; network rules; a combination thereof; and/or the like.

Returning to FIGS. 3A-3C, and as noted above, the parameter indicated by the element 312 in the example shown in FIG. 3A has a value of "1", which is based on the fact that, in this example, the playback timeline indicates at most two content segments may be available for playback for the computing device 110E (e.g., based on the segment duration value indicated by S@d in the manifest file 301A). FIG. 3C shows the timeline 316 after execution/performance/application of the modify function described herein. Specifically, as shown in FIG. 3C, the value for S@r in the element 316A is now "2", which may correspond to the at most two available content segments for output/playback. The computing device 110E may then use the modified manifest file to request the content segments for output/playback.

Additionally, or in the alternative, in some examples the manifest file 301A and the update file 300 may not be separately provided/sent to the computing device 110E in response to the corresponding request for the content item. In such examples, a device within the system 100, such as the computing device 110D of the subsystem 103, may send a response to a request for a content item as a single file, a payload, etc., that facilitates access to a content segment(s) for output/playback. The response that is sent may comprise, be indicative of, or otherwise facilitate access to the manifest file 301A and the update file 300 (or a portion(s) thereof). For example, the response may comprise a version of the manifest file 301A that comprises the modify command described herein along with one or more additional elements that enable the computing device 110E to request the content segments for output/playback. As another example, the response may comprise one or more elements of the manifest file 301A along with the modify command along with the one or more additional elements that enable the computing device 110E to request the content segments for output/playback. In a further example, the response may comprise a single file or object that causes the computing device 110E to create each of the manifest file 301 and the update file 300 based on contents of the single file or object. However, it is to be understood that other examples enabling the computing device 110E to request the content segments for output/playback based on a single file or response are possible as well.

Figure 4:
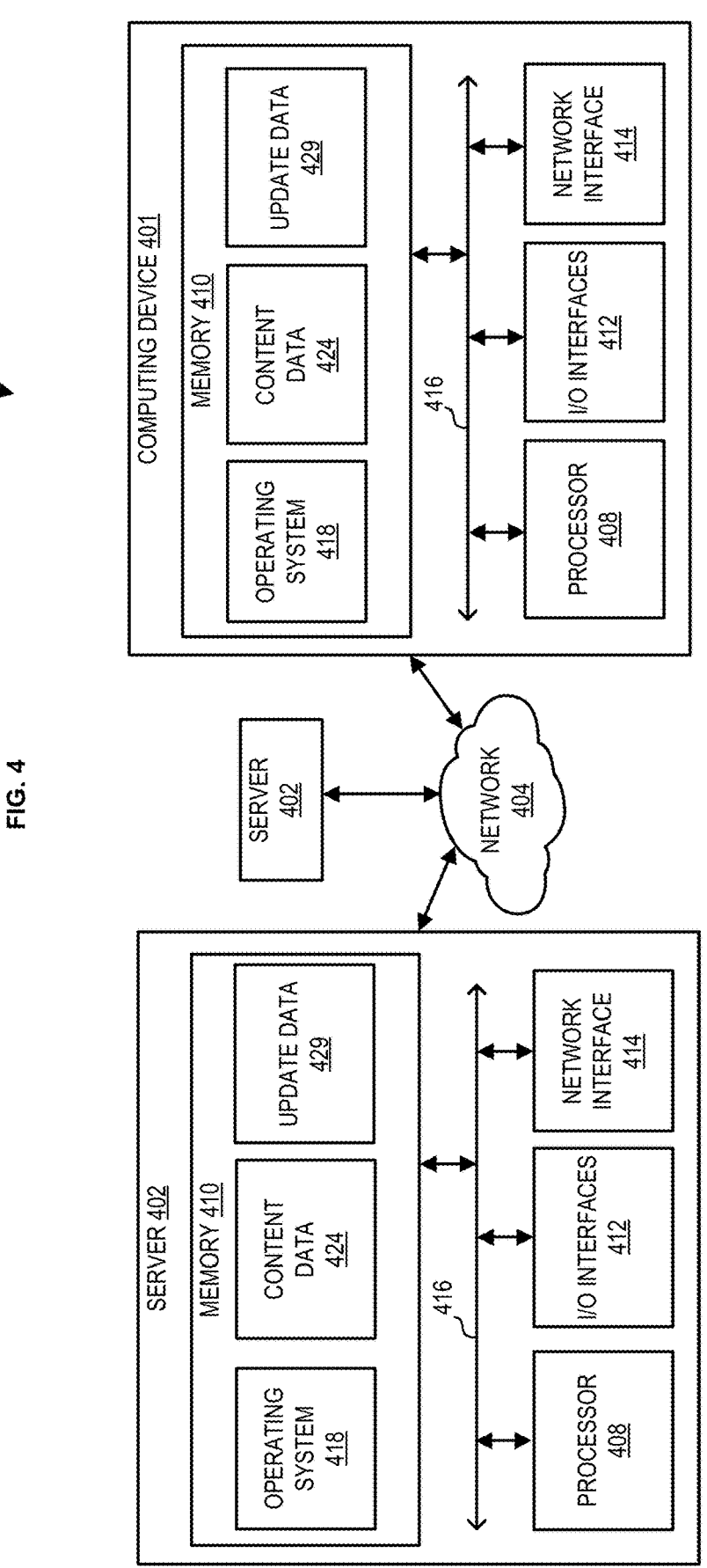
FIG. 4 shows an example system.

The present methods and systems may be computer-implemented. FIG. 4 shows a block diagram depicting a system/environment 400 comprising non-limiting examples of a computing device 401 and a server 402 connected through a network 404. Either of the computing device 401 or the server 402 may be a computing device, such as any of the computing devices 110A-110F of the system 100 shown in FIG. 1. In an aspect, some or all steps of any described method may be performed on a computing device as described herein. The computing device 401 may comprise one or multiple computers configured to store one or more of update data 429 (e.g., an update file(s), etc.), and/or the like. For example, the update data 429 may comprise a storage medium, such as any of the storage media 120A-120D described herein. The server 402 may comprise one or multiple computers configured to store content data 424 (e.g., portions of a content item and related metadata). For example, the content data 424 may comprise a storage medium, such as any of the storage media 120A-120D described herein. Multiple servers 402 may communicate with the computing device 401 via the through the network 404.

The computing device 401 and the server 402 may be a digital computer that, in terms of hardware architecture, generally includes a processor 408, system memory 410, input/output (I/O) interfaces 412, and network interfaces 414. These components (408, 410, 412, and 414) are communicatively coupled via a local interface 416. The local interface 416 may be, for example, but not limited to, one or more buses or other wired or wireless connections, as is known in the art. The local interface 416 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 408 may be a hardware device for executing software, particularly that stored in system memory 410. The processor 408 may be any custom made or commercially available processor, a central processing unit (CPU), an auxiliary processor among several processors associated with the computing device 401 and the server 402, a semiconductor-based microprocessor (in the form of a microchip or chip set), or generally any device for executing software instructions. During operation of the computing device 401 and/or the server 402, the processor 408 may execute software stored within the system memory 410, to communicate data to and from the system memory 410, and to generally control operations of the computing device 401 and the server 402 pursuant to the software.

The I/O interfaces 412 may be used to receive user input from, and/or for sending system output to, one or more devices or components. User input may be received via, for example, a keyboard and/or a mouse. System output may be output via a display device and a printer (not shown). I/O interfaces 412 may include, for example, a serial port, a parallel port, a Small Computer System Interface (SCSI), an infrared (IR) interface, a radio frequency (RF) interface, and/or a universal serial bus (USB) interface.

The network interface 414 may be used to transmit and receive from the computing device 401 and/or the server 402 on the network 404. The network interface 414 may include, for example, a 10BaseT Ethernet Adaptor, a 10BaseT Ethernet Adaptor, a LAN PHY Ethernet Adaptor, a Token Ring Adaptor, a wireless network adapter (e.g., WiFi, cellular, satellite), or any other suitable network interface device. The network interface 414 may include address, control, and/or data connections to enable appropriate communications on the network 404.

The system memory 410 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the system memory 410 may incorporate electronic, magnetic, optical, and/or other types of storage media. Note that the system memory 410 may have a distributed architecture, where various components are situated remote from one another, but may be accessed by the processor 408.

The software in system memory 410 may include one or more software programs, each of which comprises an ordered listing of executable instructions for implementing logical functions. In the example of FIG. 4, the software in the system memory 410 of the computing device 401 may comprise the update data 429, the content data 424, and a suitable operating system (O/S) 418. In the example of FIG. 4, the software in the system memory 410 of the server 402 may comprise the update data 429, the content data 424, and a suitable operating system (O/S) 418. The operating system 418 essentially controls the execution of other computer programs and enables scheduling, input-output control, file and data management, memory management, and communication control and related services.

For purposes of illustration, application programs and other executable program components such as the operating system 418 are shown herein as discrete blocks, although it is recognized that such programs and components may reside at various times in different storage components of the computing device 401 and/or the server 402. An implementation of the system/environment 400 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

Figure 5:
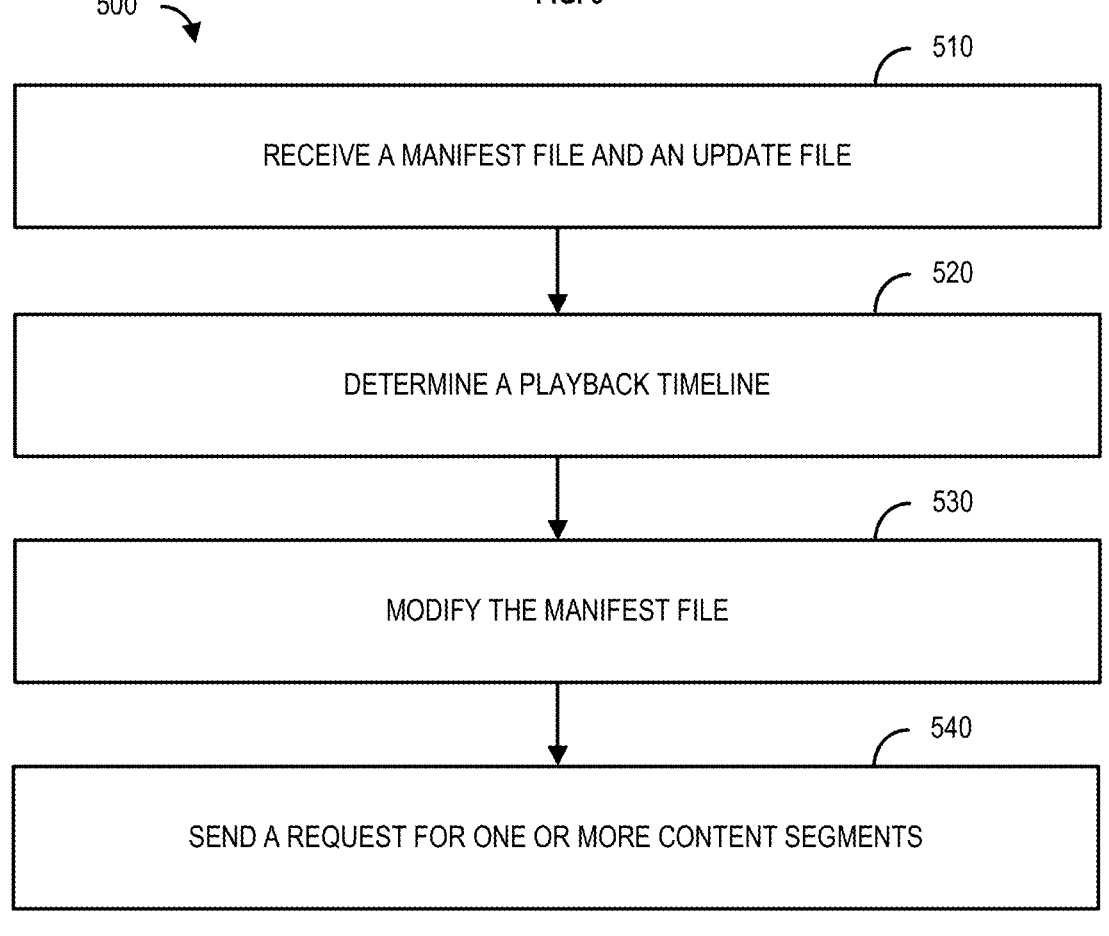
FIG. 5 shows a flowchart for an example method.

FIG. 5 shows a flowchart of an example method 500. The method 500 may be performed in whole or in part by a single computing device, a plurality of computing devices, and the like. For example, some or all steps of the method 500 may be performed by at least one of the computing devices 110A-110F shown in FIG. 1. It is to be understood that some steps of the method 500 may be performed by a first computing device, while other steps of the method 500 may be performed by another computing device(s). At step 510, each computing device of a plurality of computing devices may receive a manifest file and an update file associated with a content item. For example, each computing device of a plurality of computing devices may send a request for the content item at a first time, and each computing device may receive the manifest file and the update file in response. The content item may comprise a linear content item, a live content item, etc.

At step 520, each computing device of the plurality of computing devices may determine a playback timeline. For example, each computing device of the plurality of computing devices may determine the playback timeline corresponding to that computing device based on the manifest file. Additionally, or in the alternative, each computing device of the plurality of computing devices may determine the playback timeline based on the manifest file and a corresponding request time for that computing device. The request time for a first computing device of the plurality of computing devices may differ from the request time for a second computing device of the plurality of computing devices. The playback timeline for the first computing device may differ from the playback timeline for the second computing device based on the difference between request times. The playback timeline for each computing device may be based on an available playback time range associated with the content item. The playback time range for each computing device may be based on, as an example, the corresponding request time for that computing device and one or more most-recently-available and/or one or more most recently encoded content segments.

At step 530, each computing device of the plurality of computing devices may modify the manifest file. For example, each computing device of the plurality of computing devices may modify the manifest file based on the update file and the playback timeline corresponding to that computing device. Additionally, or in the alternative, each computing device of the plurality of computing devices may determine at least one portion of the manifest file to be modified. For example, each computing device of the plurality of computing devices may determine the at least one portion of the manifest file to be modified based on the update file and the playback timeline corresponding to that computing device. The at least one portion of the manifest file may be associated with a quantity of one or more content segments associated with the content item. The one or more content segments may be the one or more most-recently-available and/or the one or more most recently encoded content segments. The update file may comprise at least one function associated with modifying the at least one portion of the manifest file. For example, the at least one function may modify the at least one portion of the manifest file based on the quantity of the one or more content segments (e.g., the function 310).

At step 540, each computing device of the plurality of computing devices may send a request for one or more content segments associated with the content item and the playback timeline corresponding to that computing device. For example, each computing device of the plurality of computing devices may send the request based on the modified manifest file associated with that computing device. Each computing device of the plurality of computing devices may be associated with a maximum value for a time-shift buffer associated with that computing device. And the one or more content segments may be associated with a playback duration that is less than or equal to the maximum value for the time-shift buffer associated with that computing device.

Figure 6:
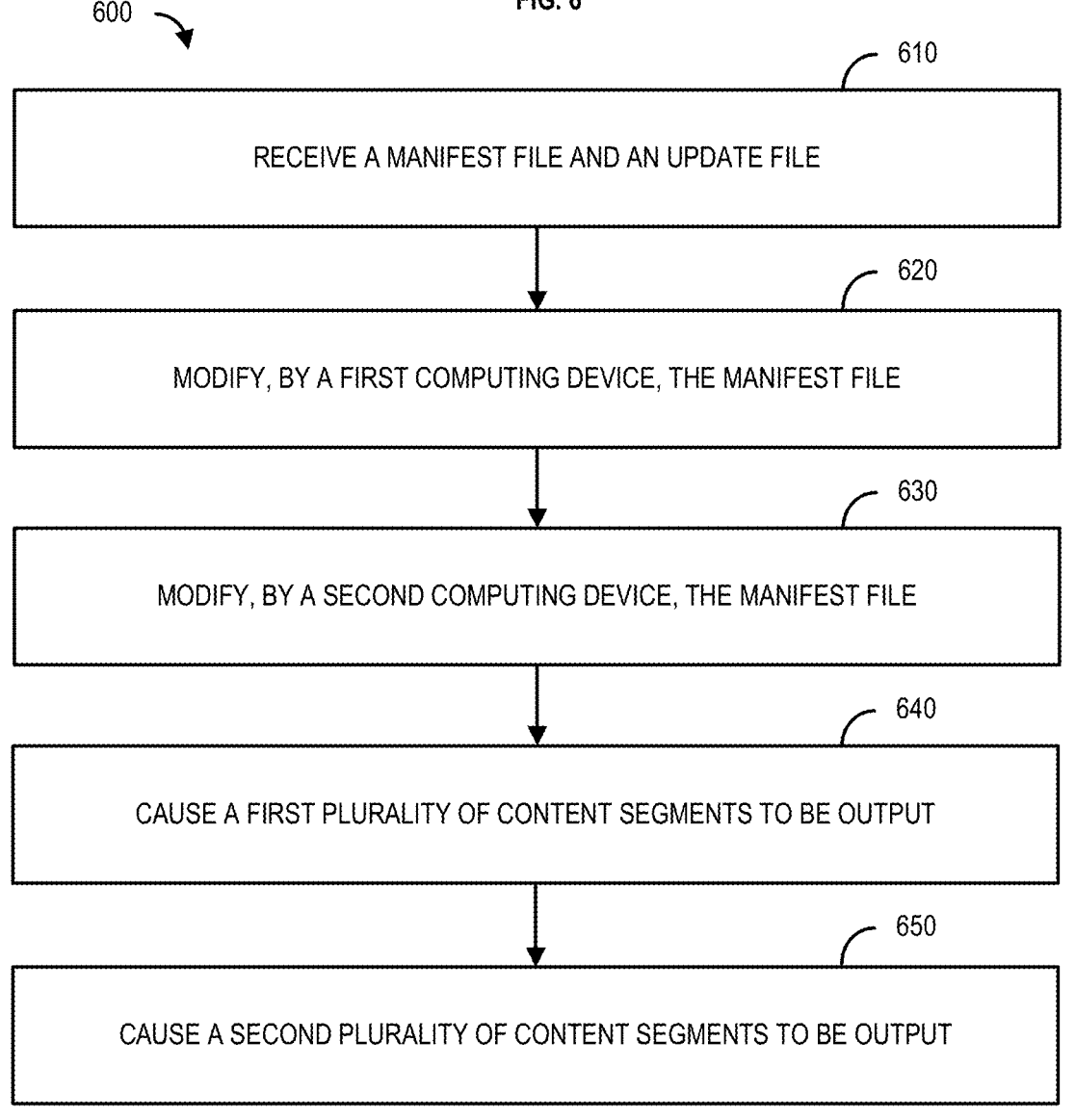
FIG. 6 shows a flowchart for an example method.

FIG. 6 shows a flowchart of an example method 600. The method 600 may be performed in whole or in part by a single computing device, a plurality of computing devices, and the like. For example, some or all steps of the method 600 may be performed by at least one of the computing devices 110A-110F shown in FIG. 1. It is to be understood that some steps of the method 600 may be performed by a first computing device, while other steps of the method 600 may be performed by another computing device(s).

At step 610, each computing device of a plurality of computing devices may receive a manifest file and an update file associated with a content item. The content item may comprise a linear content item, a live content item, etc. The update file may comprise at least one function configured to modify at least one element of the manifest file (e.g., the function 310). A first computing device, of the plurality of computing devices, may determine a first playback timeline based on a first time-shift buffer associated with the first computing device. A second computing device, of the plurality of computing devices, may determine a second playback timeline based on a second time-shift buffer associated with the second computing device. Each playback timeline may be based on an available playback time range associated with the content item. The playback time range may be based on, as an example, a corresponding request time and one or more most-recently-available and/or one or more most recently encoded content segments.

The second playback timeline may differ from the first playback timeline. For example, the second playback timeline may differ from the first playback timeline based on the first time-shift buffer comprising a maximum value that differs from a maximum value associated with the second time-shift buffer. Additionally, or in the alternative, the first playback timeline may differ from the second playback timeline based on a corresponding request time associated with each of the first computing device and the second computing device. For example, the corresponding request time for the first computing device may differ from the corresponding request time for the second computing device.

At step 620, the first computing may modify the manifest file (e.g., the manifest file stored at/received by the first computing device). For example, the first computing may modify the manifest file based on the update file and the first playback timeline. At step 630, the second computing may modify the manifest file (e.g., the manifest file stored at/received by the second computing device). For example, the second computing may modify the manifest file based on the update file and the second playback timeline.

At step 640, the first computing device may cause a first plurality of content segments associated with the content item and the first playback timeline to be output. For example, the first computing device may cause the first plurality of content segments to be output based on the modified manifest file associated with the first computing device. The first plurality of content segments may comprise one or more of the most-recently-available content segments (e.g., most recently encoded).

At step 650, the second computing device may cause a second plurality of content segments associated with the content item and the second playback timeline to be output. The second plurality of content segments may comprise one or more of the most-recently-available content segments (e.g., most recently encoded). The second computing device may cause the second plurality of content segments to be output based on the modified manifest file associated with the second computing device. The first plurality of content segments may differ at least partially from the second plurality of content segments.

Figure 7:
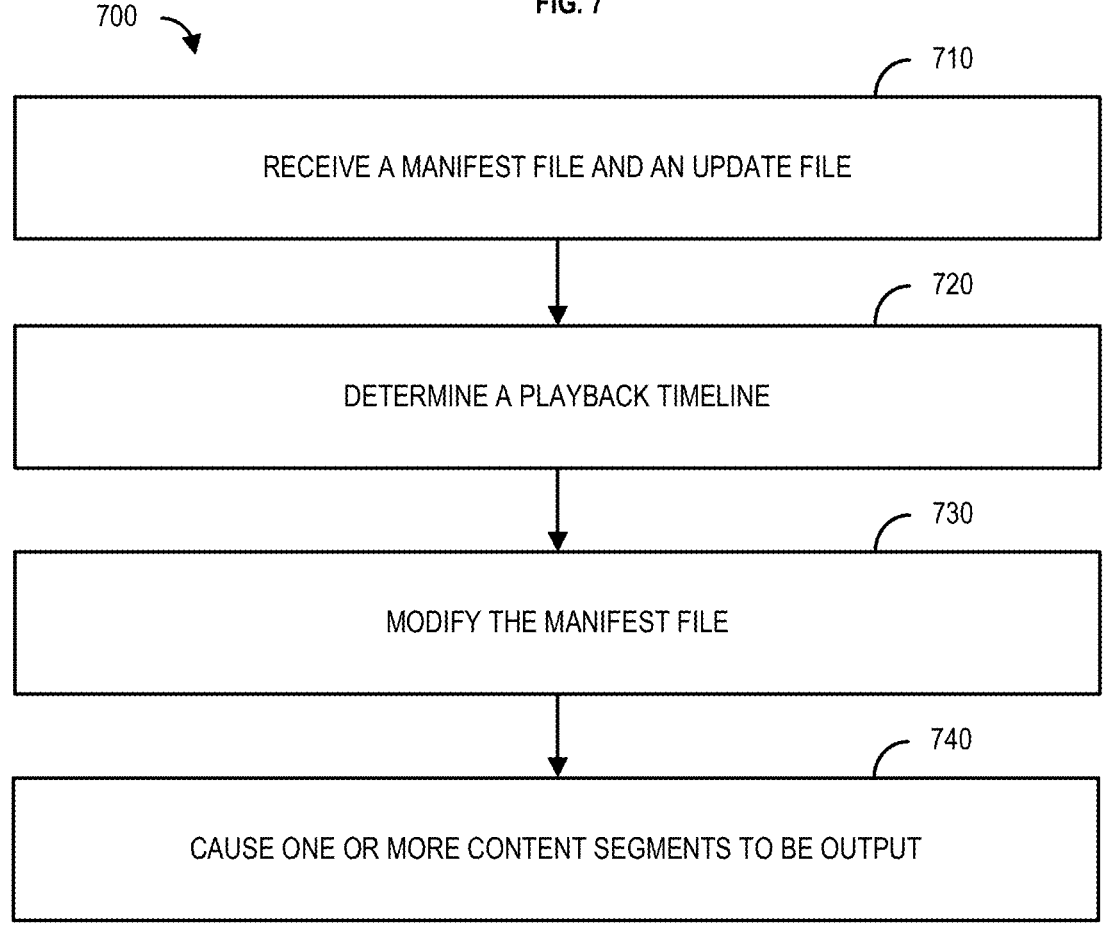
FIG. 7 shows a flowchart for an example method.

FIG. 7 shows a flowchart of an example method 700. The method 700 may be performed in whole or in part by a single computing device, a plurality of computing devices, and the like. For example, some or all steps of the method 700 may be performed by at least one of the computing devices 110A-110F shown in FIG. 1. It is to be understood that some steps of the method 700 may be performed by a first computing device, while other steps of the method 600 may be performed by another computing device(s).

At step 710, a computing device may receive a manifest file and an update file associated with a content item. The content item may comprise a linear content item, a live content item, etc. At step 720, the computing device may determine a playback timeline. For example, the computing device may determine the playback timeline based on the manifest file and a time-shift buffer. The time-shift buffer may be associated with a maximum value (e.g., a maximum duration, time, etc.). Additionally, or in the alternative, the computing device may determine the playback timeline based on the manifest file and a request time. The request time may be associated with a time that the computing device requested the content item.

At step 730, the computing device may modify the manifest file. For example, the computing device may determine at least one portion of the manifest file to be modified. The computing device may determine the at least one portion of the manifest file to be modified based on the update file and the playback timeline. The update file may comprise at least one function associated with the time-shift buffer and the at least one portion of the manifest file to be modified (e.g., the function 310).

At step 740, the computing device may cause one or more content segments associated with the content item and the playback timeline to be output. The playback timeline may be based on an available playback time range associated with the content item. The playback time range may be based on, as an example, the request time and one or more most-recently-available and/or one or more most recently encoded content segments. For example, the one or more content segments that are output may be the one or more most-recently-available and/or the one or more most recently encoded content segments.

The computing device may cause the one or more content segments to be output based on the modified manifest file. The one or more content segments may be one or more of the most-recently-available content segments (e.g., most recently encoded). The one or more content segments to be output may be associated with a playback time range. The playback time range may be based on the time-shift buffer. The at least one portion of the manifest file (e.g., the portion(s) that is modified) may be associated with a quantity of the one or more content segments. And the quantity of the one or more content segments may be based on the maximum value associated with the time-shift buffer. Additionally, or in the alternative, the one or more content segments may be associated with a playback duration that is less than or equal to the maximum value for the time-shift buffer.

Figure 8:
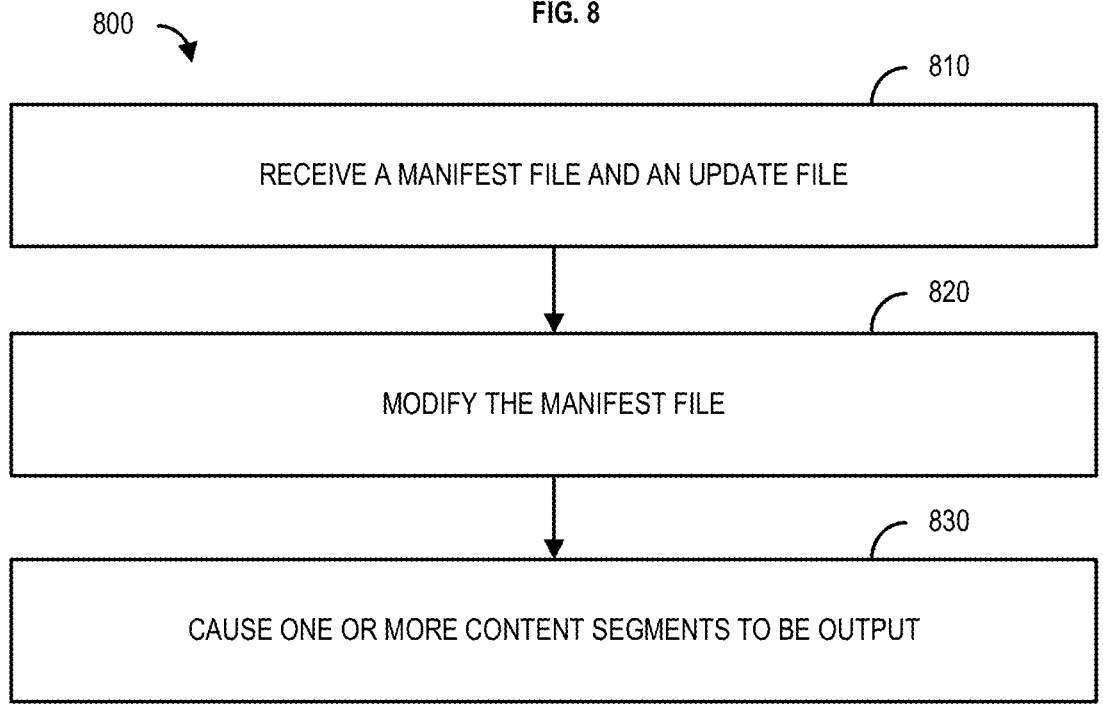
FIG. 8 shows a flowchart for an example method.

FIG. 8 shows a flowchart of an example method 800. The method 800 may be performed in whole or in part by a single computing device, a plurality of computing devices, and the like. For example, some or all steps of the method 800 may be performed by at least one of the computing devices 110A-110F shown in FIG. 1. It is to be understood that some steps of the method 800 may be performed by a first computing device, while other steps of the method 800 may (or may not) be performed by another computing device(s).

At step 810, each computing device of a plurality of computing devices may receive a manifest file and an update file associated with a content item. The content item may comprise a linear content item, a live content item, etc. The update file may comprise at least one function configured to modify at least one element of the manifest file (e.g., the function 310). The at least one element of the manifest file may be associated with a playback timeline determined by each computing device of the plurality of computing devices. The playback timeline for each computing device may at least partially differ (e.g., based on a corresponding request time, a corresponding playback timeline, and/or a corresponding time-shift buffer). The playback timeline may be based on an available playback time range associated with the content item. The playback time range may be based on, as an example, a corresponding request time and one or more most-recently-available and/or one or more most recently encoded content segments.

As an example, a first computing device, of the plurality of computing devices, may determine a first playback timeline based on a first time-shift buffer associated with the first computing device. And a second computing device, of the plurality of computing devices, may determine a second playback timeline based on a second time-shift buffer associated with the second computing device. The second playback timeline may differ from the first playback timeline. For example, the second playback timeline may differ from the first playback timeline based on the first time-shift buffer comprising a maximum value that differs from a maximum value associated with the second time-shift buffer. Additionally, or in the alternative, the first playback timeline may differ from the second playback timeline based on the corresponding request time for each second computing device. For example, the corresponding request time for the first computing device may differ from the corresponding request time for the second computing device.

At step 820, each computing device, of the plurality of computing devices, may modify the manifest file (e.g., the manifest file stored at/received by that computing device). For example, the first computing may modify the manifest file based on the update file and the first playback timeline, and the second computing may modify the manifest file based on the update file and the second playback timeline.

At step 830, each computing device, of the plurality of computing devices, may cause one or more content segments associated with the content item to be output based on the modified manifest file corresponding to that computing device. For example, the one or more content segments output by the first computing device may differ from the one or more content segments output by the second computing device (e.g., based on the corresponding request time and/or playback timeline associated with each computing device). The one or more content segments may be the one or more most-recently-available content segments (e.g., most recently encoded). Other examples are possible as well.

Figure 9:
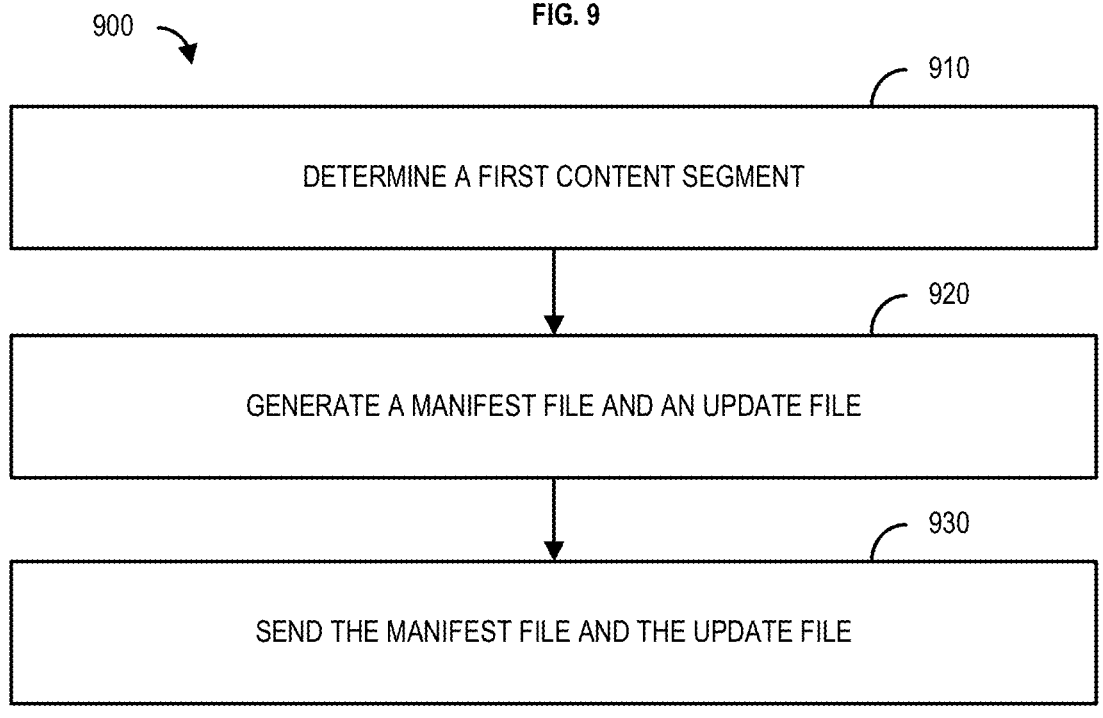
FIG. 9 shows a flowchart for an example method.

FIG. 9 shows a flowchart of an example method 900. The method 900 may be performed in whole or in part by a single computing device, a plurality of computing devices, and the like. For example, some or all steps of the method 900 may be performed by at least one of the computing devices 110A-110F shown in FIG. 1. It is to be understood that some steps of the method 900 may be performed by a first computing device, while other steps of the method 900 may be performed by another computing device(s). At step 910, a first computing device may determine a first content segment associated with a content item. The content item may comprise a linear content item, a live content item, etc. The first content segment may be the most-recently-available content segment (e.g., most recently encoded). The first computing device may be the computing device 110C, a manifest generator, a manifest updater, and/or any other suitable device(s)/module(s) for generating manifest files and update files for content (and/or portions thereof).

At step 920, the first computing device may generate a manifest file and an update file. For example, the first computing device may generate the manifest file and the update file based on the first content segment (e.g., to facilitate access thereto and/or output thereof). The manifest file may identify the first content segment. The update file may comprise at least one function configured to modify at least one portion of the manifest file (e.g., the function 310).

At step 930, the first computing device may send the manifest file and the update file to a second computing device (e.g., the computing device 110E. For example, the first computing device may send the manifest file and the update file to the second computing device) based on a request for the content item sent via the second computing device (or on its behalf) to the first computing device. The request may be associated with a request time. The request time may be associated with a time that the second computing device requested the content item. The second computing device may determine a playback timeline. For example, the second computing device may determine the playback timeline based on the manifest file. Additionally, or in the alternative, the second computing device may determine the playback timeline based on the manifest file and the request time. The playback timeline may be based on an available playback time range associated with the content item. The playback time range may be based on, as an example, the request time and the first content segment (e.g., the most-recently-available and/or the most recently encoded content segment).

Additionally, or in the alternative, the playback time range may be based on a time-shift buffer associated with the second computing device (e.g., a storage medium or media for storage/buffering of content segments).

The second computing device may modify the manifest file. For example, the second computing device may modify the manifest file based on the update file and the playback timeline/playback time range. Additionally, or in the alternative, the second computing device may determine, based on the update file and the playback timeline corresponding to that computing device, at least one portion of the manifest file to be modified. The at least one portion of the manifest file may be associated with a quantity of content segments. The update file may comprise at least one function associated with modifying the manifest file based on a quantity of content segments associated with the playback timeline/playback time range. The second computing device may receive and subsequently output at least the first content segment. For example, the first computing device or another computing device may send at least the first content segment to the second computing device for output/playback.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:

receiving, by each computing device of a plurality of computing devices, a manifest file and an update file associated with a content item, wherein each computing device of the plurality of computing devices receives the manifest file and the update file based on a request time associated with that computing device and the content item;

determining, by each computing device of the plurality of computing devices, based on the manifest file and the request time corresponding to that computing device, a playback timeline;

modifying, by each computing device of the plurality of computing devices, based on the update file and the playback timeline corresponding to that computing device, a parameter value in the manifest file indicating a quantity of content segments; and sending, by each computing device of the plurality of computing devices, based on the quantity of content segments indicated by the modified parameter value in the manifest file associated with that computing device, a request for one or more content segments associated with: the content item and the playback timeline corresponding to that computing device.

2. The method of claim 1, wherein the content item comprises a linear content item or a live content item.

3. The method of claim 1, wherein the request time is associated with a time that the corresponding computing device, of the plurality of computing devices, requested the content item.

4. The method of claim 1, wherein each computing device of the plurality of computing devices is associated with a maximum value for a time-shift buffer associated with that computing device.

5. The method of claim 4, wherein the one or more content segments are associated with a playback duration that is less than or equal to the maximum value for the time-shift buffer associated with that computing device.

6. The method of claim 1, wherein modifying the manifest file comprises determining, by each computing device of the plurality of computing devices, based on the update file and the playback timeline corresponding to that computing device, at least one portion of the manifest file to be modified, wherein the at least one portion of the manifest file is associated with a quantity of the one or more content segments.

7. The method of claim 6, wherein the update file comprises at least one function associated with the quantity of the one or more content segments.

8. A system comprising:
a plurality of computing devices, wherein each computing device of the plurality of computing devices is configured to:
receive a manifest file and an update file associated with a content item, based on a request time associated with the computing device and the content item;
determine, based on the manifest file and the request time, a playback timeline;
modify, based on the update file and the playback timeline, a parameter value in the manifest file indicating a quantity of content segments; and
send, based on the quantity of content segments indicated by the modified parameter value in the manifest file, a request for one or more content segments associated with: the content item and the playback timeline;
and
at least one second computing device configured to send the one or more content segments.

9. The system of claim 8, wherein the content item comprises a linear content item or a live content item.

10. The system of claim 8, wherein the request time is associated with a time that the corresponding computing device, of the plurality of computing devices, requested the content item.

11. The system of claim 8, wherein each computing device of the plurality of computing devices is associated with a maximum value for a time-shift buffer associated with that computing device.

12. The system of claim 11, wherein the one or more content segments are associated with a playback duration that is less than or equal to the maximum value for the time-shift buffer associated with that computing device.

13. The system of claim 8, wherein each computing device, of the plurality of computing devices, is further configured to determine, based on the update file and the playback timeline, at least one portion of the manifest file to be modified, wherein the at least one portion of the manifest file is associated with a quantity of the one or more content segments.

14. The system of claim 13, wherein the update file comprises at least one function associated with the quantity of the one or more content segments.

15. A method comprising:
sending, to each computing device of a plurality of computing devices, a manifest file and an update file associated with a content item, wherein each computing device of the plurality of computing devices:
receives the manifest file and the update file based on a request time associated with that computing device and the content item, and determines, based on the manifest file and the request time corresponding to that computing device, a playback timeline;
receiving, via each computing device of the plurality of computing devices, based on a modified parameter value, indicating a quantity of content segments, in a manifest file associated with that computing device, a request for one or more content segments associated with: the content item and the playback timeline corresponding to that computing device, wherein each computing device of the plurality of computing devices modifies, based on the update file and the playback timeline corresponding to that computing device, the parameter value in the manifest file indicating the quantity of content segments; and
causing the one or more content segments to be output at each computing device of the plurality of computing devices.

16. The method of claim 15, wherein the content item comprises a linear content item or a live content item.

17. The method of claim 15, wherein each request time is associated with a time that the corresponding computing device, of the plurality of computing devices, requested the content item.

18. The method of claim 15, wherein each computing device of the plurality of computing devices is associated with a maximum value for a time-shift buffer associated with the corresponding computing device of the plurality of computing devices.

19. The method of claim 18, wherein the one or more content segments are associated with a playback duration that is less than or equal to the maximum value for the time-shift buffer associated with the corresponding computing device of the plurality of computing devices.

20. The method of claim 15, wherein the plurality of computing devices comprises a plurality of user devices.

* * * * *